March 12, 1963 D. ROSE 3,080,974
WATER SOFTENING APPARATUS AND SYSTEM
Filed March 1, 1960 10 Sheets-Sheet 1

Fig.1

INVENTOR
Donald Rose
BY Beale & Jones
ATTORNEY

INVENTOR
DONALD ROSE
BY Beale & Jones
ATTORNEYS

March 12, 1963  D. ROSE  3,080,974
WATER SOFTENING APPARATUS AND SYSTEM
Filed March 1, 1960  10 Sheets—Sheet 6

INVENTOR
Donald Rose
BY Beale and Jones
ATTORNEY

March 12, 1963 D. ROSE 3,080,974
WATER SOFTENING APPARATUS AND SYSTEM
Filed March 1, 1960 10 Sheets-Sheet 7

INVENTOR
DONALD ROSE

BY Beale & Jones

ATTORNEYS

March 12, 1963

D. ROSE 3,080,974

WATER SOFTENING APPARATUS AND SYSTEM

Filed March 1, 1960

INVENTOR
DONALD ROSE

BY *Beale & Jones*

ATTORNEYS

March 12, 1963   D. ROSE   3,080,974
WATER SOFTENING APPARATUS AND SYSTEM
Filed March 1, 1960   10 Sheets-Sheet 10

INVENTOR
DONALD ROSE

BY *Beale & Jones*

ATTORNEYS

United States Patent Office 3,080,974
Patented Mar. 12, 1963

3,080,974
WATER SOFTENING APPARATUS AND SYSTEM
Donald Rose, Dayton, Ohio, assignor of one-half to
Ronald D. Baker, Dayton, Ohio
Filed Mar. 1, 1960, Ser. No. 12,168
5 Claims. (Cl. 210—126)

This invention is directed to apparatus and control mechanism for treating liquids and in more particular to water softening apparatus.

This application is a continuation-in-part of my co-pending application Serial No. 707,267, filed January 6, 1958.

A primary object of this invention is to provide means for treating hard water by use of a mineral softener wherein optimum conditions of use of the mineral substance is maintained automatically.

Another object of the invention is to provide an automatically operated water treating apparatus that is economical to install and to maintain and yet provides reliable operation.

A further object of the invention is to provide a reliable and economical installation for treating water that utilizes downflow softening, controlled upflow backwash, controlled downflow brining and rinsing and controlled downflow final rinse in a manner to make greatest utilization of a mineral material used for treating water.

A still further object of the invention is to provide a water treating apparatus that can cope with iron and turbid waters as well as hard water.

Another object of this invention is to provide a water treating system that has a minimum of moving parts to accomplish a full automatic operation that utilizes the mineral to maximum advantage.

Yet a further object of the invention is to provide an automatic water softening apparatus that provides for dry storage of salt and makes maximum use of the salt supply that is used for regeneration of the mineral material.

A still further object of the invention is to provide an economical automatic water softener that uses a minimum amount of water, yet accomplishes a maximum utilization of the mineral material used for treating the water.

Another object of the invention is to provide in a water softener a control means that permits easy manual initiation of a regeneration with subsequent automatic operation of the apparatus.

Yet a further object of the invention is to provide in an automatic water treatment apparatus brine tank overflow automatic control.

A further object of the invention is to provide in an automatic water treatment apparatus an electrical power cut off to the apparatus on the liquid level in the brine tank reaching a higher emergency level whereby the apparatus is placed in softening or service condition and overflow of the brine is prevented.

Another object of the invention is to provide a float and switch assembly with connected circuits for the brine tank of an automatic water softener and treatment apparatus for controlling normal softening or service position of the apparatus, brining positioning, slow rinse positioning and fast rinse positioning of the apparatus as well as complete cut off of electrical power to the operating apparatus.

Other objects and advantages will appear from the following description and the accompanying drawings in which.

For a more complete understanding of the nature and scope of my invention, reference may be had to the description hereinafter given in which like reference characters refer to similar parts.

The system includes the usual softener tank S containing the necessary minerals M for treating the hard water and a brine tank B that is loaded with salt which will have dry storage above the water level L and is sufficient, for example, for a normal house for one year upon one loading of the tank.

Figure 13:
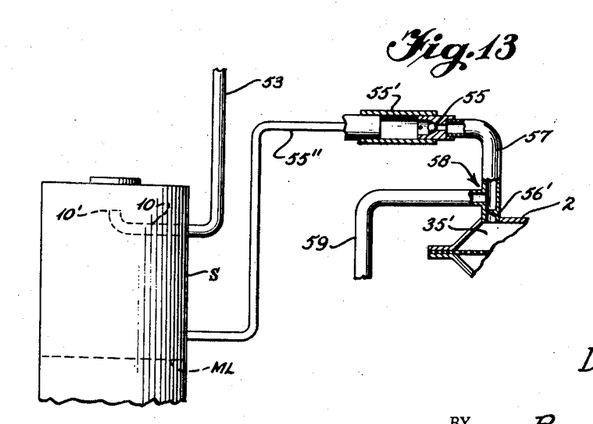
FIG. 13 is a modification showing the brining line attached to the softener tank just above the mineral bed.

Tank S, the softener tank, has the hard water top distributor 10 of plastic material having an upwardly curved end 10' within the tank adjacent the top thereof. This distributor on backwash cycle is connected to the drain and it has a curved neck which is always open to eliminate restrictions. Since the backwash is controlled, as will be explained hereinafter, there can be no loss of mineral M at any pressure, however, there is nothing to prevent iron or turbidity from being washed out of the softener tank S during the backwash cycle. The softener tank S has a freeboard F above the mineral bed of about 50 percent of the height of the tank. In operation, supply of brine during regeneration is provided preferably from a point about 1 inch above the mineral bed level ML which is shown as a modified connection in the drawings, see FIG. 13. By using this introduction of brine, the brine concentration is, therefore, not diluted by freeboard water F above the mineral bed M which has been isolated in the upper portion of tank S. The brine strength is always in the range of 8–12 percent by weight (30°–50° salometer). The mineral M in the tank is of a high capacity resin to provide for ion exchange in water softening. The brine tank B is preferably of plastic material to reduce corrosion and it has an easily removable cover 12 exposing the whole open end of the tank when the cover is removed for filling. In the brine tank B is positioned a cylindrical tube 13 of non-corrosive and durable plastic material. This plastic tube 13 has a plurality of spaced apart apertures 13a in the base thereof adjacent the bottom of the tank B to permit flow therethrough of water or brine. At the top portion of tube 13 is a vertically extending slot 13' within which extends for pivotal movement up and down an arm 14 that operates a microswitch in the controls and in a high up position it operates a set of safety switches to permit recycling and thus relieve any overflow of tank B, as will be described. Pivotally connected to arm 14 is a float rod 15 having a float 16 adjustably secured adjacent the bottom thereof and operating freely within cylinder 13 without any interference from the salt supply. Secured to the cylindrical tube 13 by a rubber grommet 17 is a common brine suction and water replacement conduit 18 of non-corrosive plastic material. Conduit 18 has a curved lower end 17' extending into tube 13 through grommet 17 at the bottom just above apertures 13a. In normal house operation, the brine and water level L reached is not more than 8 inches from the bottom of the tank B, there being approximately 2 inches of flint gravel G at the bottom of the tank B to distribute brine evenly. Brine is removed from the bottom of the brine tank B through a suction placed on conduit 18 and as this occurs the float 16 drops and arm 14 is pivoted downwardly. The float well may be positioned outside of the brine tank but it would still be connected with the brine tank so that the liquid level in the brine tank and the well would simultaneously be the same. Following removal of the brine BR from the bottom of tank B for a regeneration action of the minerals M in tank S and a slow rinse of the minerals, replacement water is introduced through tube 18 until float 16 reaches a predetermined setting, whereupon the arm 14 moves a microswitch as will be described to place the system back into service condition of treating the hard water flowing through softener tank S. The arrangement of refill or replacement water at the bottom of tank B provides for the highest concentration of brine at all times and the unit will operate efficiently with as little as 15 pounds of salt remaining in a typical brine tank B. The common brine and the water replacement line 18, since it is used for draw-off of brine and refill of replacement water, is continually flushed out and thus any clogging is eliminated. Each regeneration cycle forces replacement water in a reverse direction down through the conduit 18. In connection with the tank B and the float 16 thereof, controls are provided as will be described which prevent a water level rise of more than 1½ inches, for example, above the normal level of the water L at the bottom of the brine tank B. Thus, should the level rise to this point, the automatic controls place the system in operation to carry out a brining, slow rinse, and fast rinse operation to place the system back in service, as will be described. When this occurs, since the system provides for a by-pass of about 25 percent pressure to the house lines during operation of a recycle, there is a warning given to the householder of any unusual condition. Since any overflow is prevented and brine BR is taken off without loss as it is forced through a brining cycle, no brine is lost. The salt storage is a dry storage since the brine and water level L at the bottom of tank B is only about 8 inches from the bottom. Thus, there is no difficulty in refilling the brine tank with dry salt and no brine can spill over.

Automatic control is provided through proper valve and conduit arrangement and control thereof. The automatic water treating apparatus according to the invention is easily adjusted to provide for a big capacity range of operation. By merely adjusting the height of the float 16 along the rod 15 with which it has a friction fit through rubber sleeves 16', a greater amount of replacement water may be introduced and a greater amount of brine produced for a greater capacity operation. Optimum conditions of use of minerals have been determined by the mineral suppliers and it is an object of this invention to provide an automatic water softening apparatus that will economically and automatically make best use of the supplied minerals. Some of the requirements of the mineral manufacturers to provide best performance is that softening shall take place on downflow, backwash should be on upflow at a rate of between 4–5 gallons per square foot of minerals per 10 minutes. However, in the apparatus according to this invention provision is made for the equivalent of 6 gallons per minute per square foot for 10 minutes of upflow backwash. Brining and slow rinse is a downflow operation as is the fast rinse which immediately follows just prior to the return of the apparatus to service condition.

Figure 1:
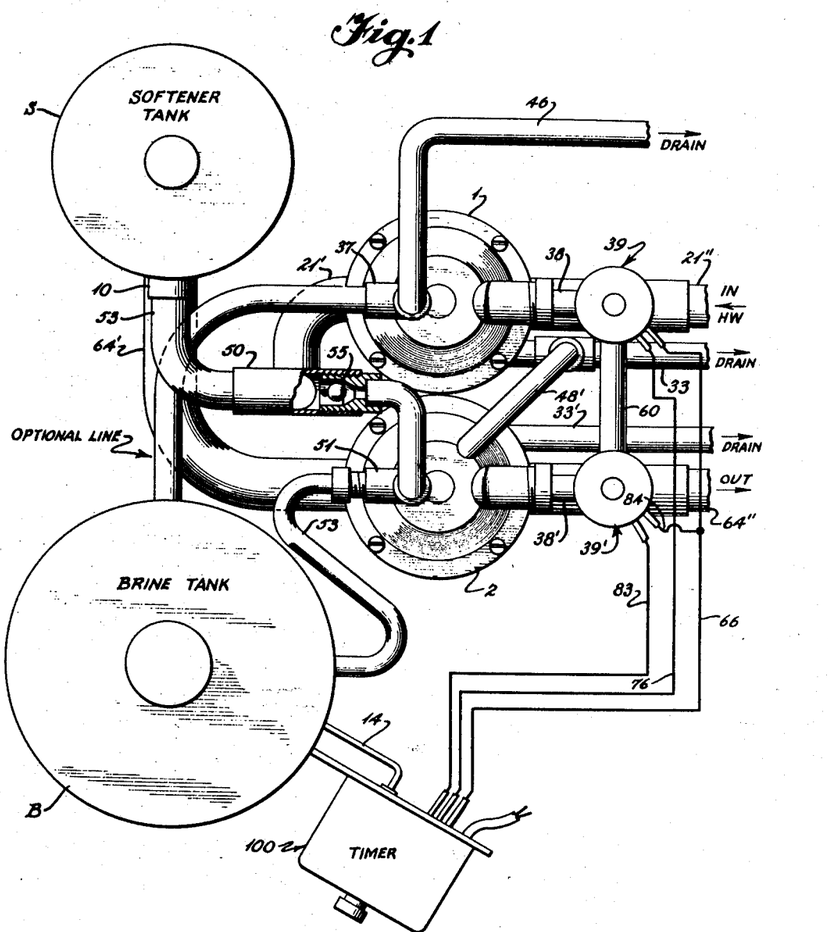
FIG. 1 is a plan view of one form of the system.
Figure 2:
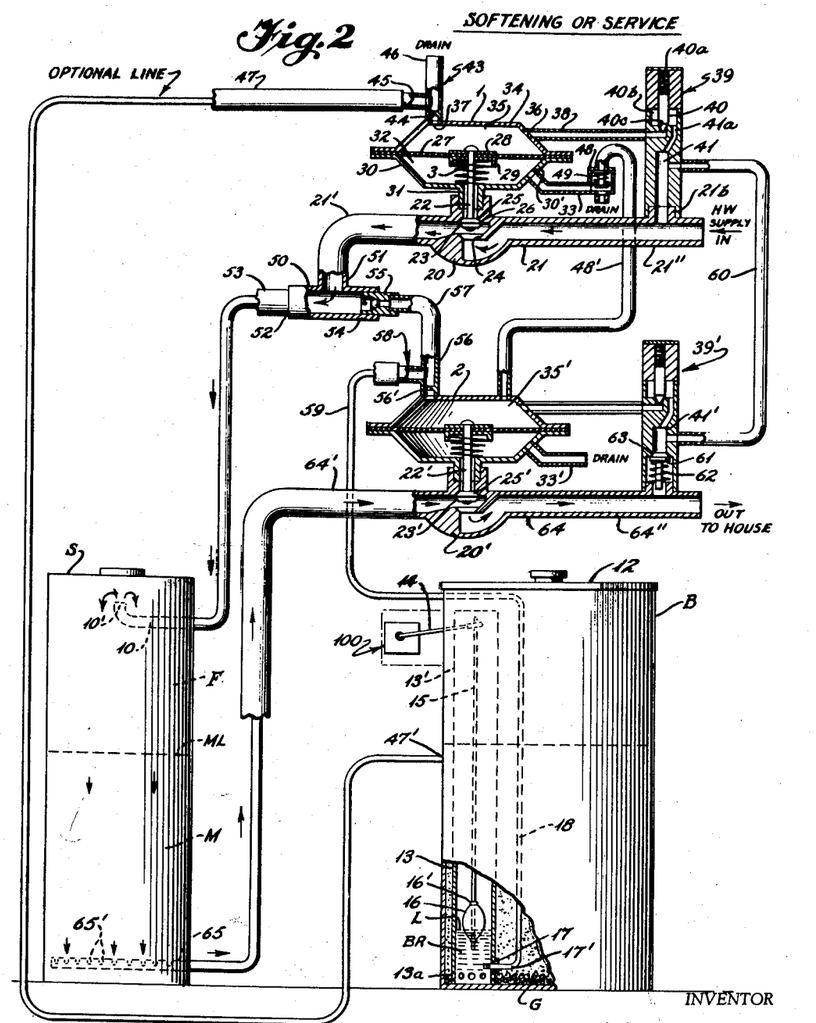
FIG. 2 is a side elevation of the system in FIG. 1 with some of the valve mechanism and conduits shown on an enlarged scale.

Referring to FIGURES 1 and 2 shows a valve unit 1 and a valve unit 2 which in the illustration are diaphragm operated units, however, piston or other actuators may equally as well be utilized. Units 1 and 2 are of like construction and unit 1 will be described. A valve body 20 is connected in a hard water supply line 21 having a first portion 21' leading to the softener tank S and a second portion 21" connected to a hard water pressure supply HW. Unit 1 has a first valve element 22 with valve washer 23 seating on valve seat 24 in body 20 and a valve washer 25 seating on valve seat 26 in the body 20. A flexible diaphragm 27 is connected at the top of valve element or rod 22. A rigid top washer 28 and a lower cup-shaped rigid washer 29 make a firm connection between element 22 and diaphragm 27. A lower half cup-shaped member 30 having a downwardly extending neck 31 is connected in the top of valve body 20. A passageway is formed by neck 31 about element 20 so as to provide communication between conduit 21' and the lower chamber 32 between diaphragm 27 and member 30. A spring 3 is positioned between washer 29 and member 30 urging the first valve element into up or service position. The member 30 is apertured at 30' and to aperture 30' is connected a drain line 33. An upper half cup-shaped member 34 forms a pressure chamber 35 with the upper side of diaphragm 27. The upper half member 34 has two apertures 36 and 37. To aperture 36 is connected a hard water pressure branch line 38 which leads to a solenoid controlled control valve unit 39. Unit 39 has a spring loaded valve 40 by spring 40a. The bottom of valve unit 39 has a passageway 41 which is connected to a branch 21b of line 21. A passageway 41a in valve body 39 communicates at its lower end with passageway 41 and at its upper end with chamber 40b. In the valve unit 39 is a seat 40c at the base of chamber 40b and valve 40 seats on this seat 40c to interrupt flow of hard water under pressure from the hard water pressure supply HW to branch line 38 leading to pressure chamber 35 of valve unit 1.

Attached to valve unit 1 and particularly the top half 34 of the pressure actuator at aperture 37 thereof is a first ejector 43 having a jet orifice 44 therein, a suction line 45 and a discharge line 46 that leads to a common drain of the system. Suction line 45 is connected by a suction line 47 leading to the brine tank B at a high level 47' thereof to provide for an emergency suction on the brine tank should the water level ever rise that high in brine tank B.

A cut-off valve 48 is positioned in drain line 33 adjacent the valve unit 1 and it is biased opened by a spring 49. This valve 48 is pressure actuated and a conduit 48' leads from the pressure chamber 35' on valve unit 2. Thus when the chamber 35' of unit 2 is pressurized, cut-off valve 48 closes the drain from valve unit 1.

The position shown for both valve units 1 and 2 in FIG. 2 is a service position wherein both solenoid controlled valves 39 and 39' are closed.

A fitting 50 is connected at 51 with line 21' of unit 1 while a line 53 leads from connection 52 on the fitting 50 to the distributor line 10 in the top of softener tank S. A check valve 55 is connected to the remaining connection 54 of the fitting 50. An ejector 56 on valve unit 2 is connected to the pressure chamber 35' thereof. The discharge line 57 from the ejector 56 is connected to the fitting 50 through the ball check valve 55. This check valve 55 closes when hard water pressure in line 21 is applied when valved element 23 is off of its seat 24. Ejector 56 has an orifice 56' therein and its suction connection 58 is connected by a conduit 59 to the common brine suction and water replacement line 18 in the brine tank B.

A by-pass line 60 is connected at one end to the hard water supply of passage 41 in valve unit 39 and at its other end to passage 41' in control valve unit 39'. In the bottom of unit 39' is a check valve 61 which is spring loaded at 62 to seat against a seat 63 to permit passage of hard water to a service line 64. Service line 64 has a first portion 64' and a second portion 64". The first portion 64' extends between valve body 20 and the soft water fitting 65 adjacent the bottom of the softener tank S. Fitting 65 is of plastic material and has a plurality of transverse slots 65' in the top thereof.

Valve unit 2 has similar parts to those of valve unit 1 including the valve element 22' having valved elements 23' and 25'. The second portion 64" of the service line 64 leads to the house connection to supply soft water. Check valve 61 permits a by-pass of hard water to the house connection or service line 64" when valve unit 1 is actuated. Through this by-pass line 60 and the check valve 61 hard water pressure is provided for temporary house use and for backwash through valve unit 2 to the soft water service outlet 65 of softener tank S when valve unit 1 is actuated to cut off hard water pressure to the top of the softener tank S. The backwash cycle will now be described.

*Backwash*

Figure 3:
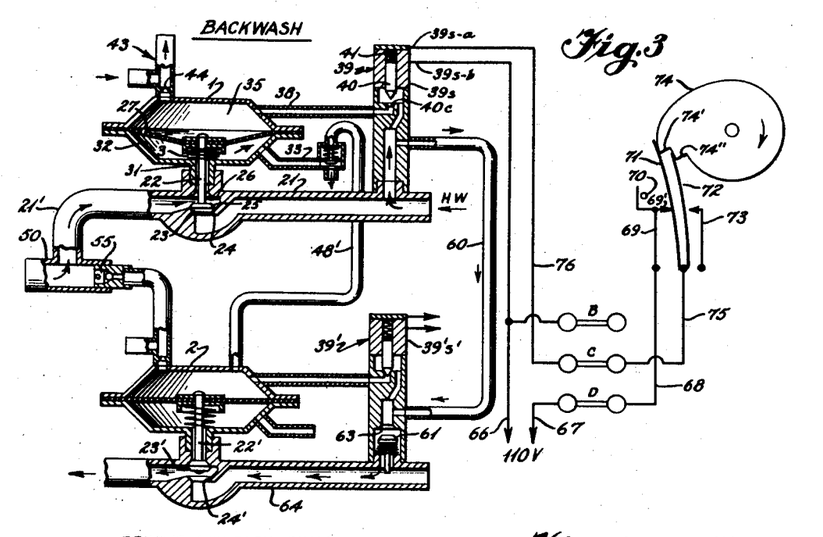
FIG. 3 is a view of the valve mechanism of FIG. 2 including circuit control mechanism showing the backwash position of the valves.

Reference to FIG. 3 shows the position of the first valve element 22 and the second valve element 22' and the valved elements thereon. A control circuit is shown that energizes solenoid 39s of valve 39. An electrical power supply of 110 volts is indicated and one conductor 66 leads to one terminal of solenoid 39s while the other power lead 67 leads to a terminal D which is connected by a conductor 68 to a movable power switch leaf spring 69. Element 69 is controlled by an actuator pin 70 in a clock mechanism to be described. A pair of spring contacts 71 and 72 are in circuit together and are actuated by steps 74' and 74" on a cam 74 which cam is operated by the clock mechanism. Contact 69' on power element 69 touches spring contact when pin 70 carried by an actuating arm allows element 69 to move to its illustrated position. A circuit is completed through 71 to a conductor 75 connected to terminal C of the terminal block. Terminal C is connected by conductor 76 to the other terminal of solenoid 39s.

When solenoid 39s is energized, as shown in FIG. 3, valve 40 is pulled up against spring 41 and off of its seat 40c allowing hard water pressure to enter conduit 38 and pressurize chamber 35. Orifice 44 of ejector 43 is smaller than the orifice at seat 40c thus pressurizing chamber 35 and forcing diaphragm 27 downward to move first valve element 22 downward. Orifice 44 of the ejector 43 vents chamber 35 when control valve 39 closes. In the position shown in FIG. 3, valve washer 23 seats on seat 24 and closes off hard water supply through conduit 21. Valve washer 25 unseats from its seat 26 and a passage from conduit 21', the first portion of conduit 21 is thus provided through the neck 31 by the valve element 22 into lower chamber 32 and out to the drain 33. Thus, the pressure is relieved at the top of softener tank S and the distributor 10. At the same time that softener tank S is depressurized, hard water pressure from by-pass 60 unseats check valve 61 from its seat 63 and allows hard water under pressure to pass through service line 64, past valve seat 24', on to the soft water connection 65 of the softener tank S. The backwash water passes up through the mineral M in softener tank S and flushes out any residue including iron particles and turbidity particles. Tank S discharges the backwash through distributor 10 to conduit 53, through fittings 50, connection 51 and on to conduit 21' which leads to drain 33 through valve unit 1 as described. The backwash takes place in about ten minutes in this particular set-up of this system.

*Brining and Slow Rinse*

Figure 4:
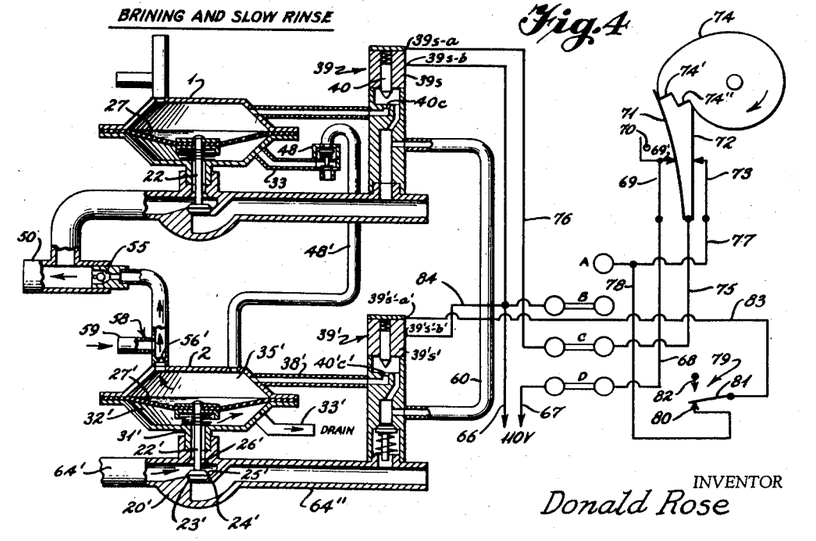
FIG. 4 is a view of the valve mechanism of FIG. 2 including circuit control mechanism showing the position of the valves for brining and slow rinse.

The next cycle of the regeneration as controlled by the control mechanism, here illustrated as a time mechanism, is that of brining and slow rinse, a downflow travel of brine and rinse water through the minerals M in the softener tank S. Reference to FIG. 4 shows this cycle of the regeneration. In this cycle both of the solenoids 39s and 39's' are energized by the control circuit as illustrated. Solenoid 39s has remained energized as in backwash and first valve element 22 is down as in position of backwash. Brine is supplied through ejector 58 as is the slow rinse water.

The circuit for solenoid 39s is continued as in FIG. 3 for backwash. In addition, cam 74 has been rotated further clockwise by the timing mechanism, contact 72 has moved to the right to make contact with contact spring 73. Spring contact 73 is connected to a conductor 77 leading to terminal A. A conductor 78 leads from terminal A and 77 to a terminal contact 80 of a microswitch 79 generally indicated at 79, thence through movable leaf spring 81 in the microswitch 79 to conductor 83 which leads to one terminal of solenoid 39's'. The other terminal of solenoid 39's' is connected to the other side 66 of the 110 v. power supply by a conductor 84. The purpose of the microswitch 79 having the externally actuated movable contact lead 81 will be hereinafter described in the fast rinse cycle.

In carrying out the brining and slow rinse, both the first valve element 22 and the second valve element 22' are moved downward by their actuators, pressure diaphragms 27 and 27' respectively, here illustrated.

The pressurization of chamber 35' of valve unit 2 by hard water pressure from by-pass 60, through control valve 39' and conduit 38', moves second valve element downward, valve washer 23' seats against its seat 24' in valve body 20' cutting off water flow in the second portion 64" of service line 64. The movement of valve washer 25' off of its seat 26' opens a passageway in the valve body 20' from the first portion 64' of the service line to the second valve element 22' in the neck 31' and on through lower chamber 32' to the drain 33'. Thus, the line 64' attached to the soft water discharge fitting 65 of softener S provides a drain to the softener tank S. The jet orifice 56' in ejector 58 is of a smaller size than the orifice at valve seat 40'c' of control valve 39' and pressure is built up in chamber 35'. Jet orifice 56' is of such size that hard water under pressure passes therethrough to draw the brine from brine tank B through conduits 18 and 59 and after brining a slow rinse is provided therethrough. The brine and water mixture from jet 56' is discharged by the ejector 58 through check valve 55 and through fitting 50 to the top of tank S. Cut-off valve 48 has been pressurized through conduit 48' connecting its pressure actuating side with pressure chamber 35' of valve unit 2. Thus, the drain portion 33 of the first valve unit 1 has been closed. With the closure of the cut-off drain valve 48, valve unit 1 is isolated and the brine passes from ejector 58, through check valve 55, fitting 50, line 53, and distributor 10, to the top of the softener tank S. The brine passes through the minerals M thereby treating same and is discharged through fitting 65, line 64', through valve body 20' by seat 25', through the neck 31' about the valve element 22' and on to chamber 32' and drain 33'.

Figure 5:
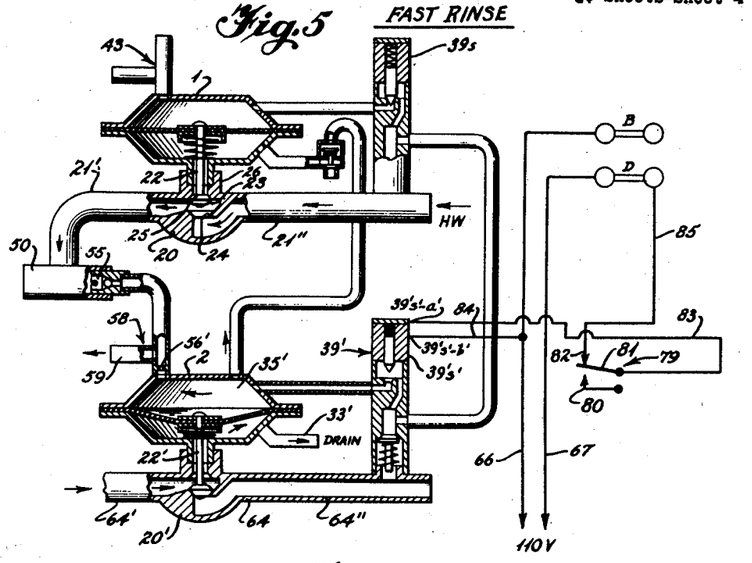
FIG. 5 is a view of the valve mechanism of FIG. 2 including circuit control mechanism showing the position of the valves for fast rinse with a holding circuit for one of the solenoids.

As the cam 74 rotates further clockwise, step 74' will let spring contact 71 move to the right out of contact with the power contact 69, 69' and the circuit to solenoids 39s and 39's' will be broken, however, a holding circuit is provided as shown in FIG. 5, to energize solenoid 39's' and hold the second valve element 22' down as will presently be described for a fast rinse.

The slow rinse that takes place during the brining and slow rinse cycle takes about 20 minutes for the particular set up of the illustrated system to carry out the proper regeneration of the mineral M and its slow rinse. After the brine BR has been drawn off from the bottom of the brine tank B, by ejector 58, hard water for slow rinse passes through ejector 58 and by the same conduits on through check valve 55 to the top of the softener tank S.

The fast rinse will now be described.

*Fast Rinse*

Figure 8:
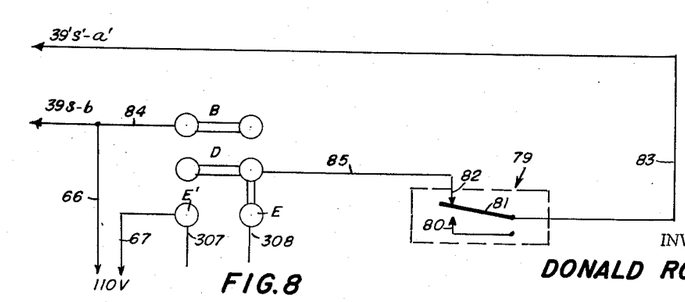
FIG. 8 shows the portion of the circuit of FIG. 1 for fast rinse following brining and slow rinse.

The fast rinse is the last one of the regeneration cycles. Reference to FIGS. 5 and 8 show the valve positions and circuit arrangement.

The second valve element 22' as shown in valve unit 2 is in the down position as solenoid 39's' is energized as in brining and slow rinse, just described above. The position and arrangement of valve unit 2 is thus the same as shown in FIG. 4 and the softener tank S is still draining through valve unit 2 by the second valve element 22' and to the drain line 33'. Solenoid 39's' receives its energization, as shown in FIG. 8 and the circuit in FIG. 5. One side 39's'-b' of the solenoid 39's' is connected to the line 66, as before, leading to one side of the 110 v. power supply. The other terminal 39's'-a' of the solenoid 39's' is now supplied through line 83, microswitch 79 contacts 81 and 82, line 85, terminal D and power lead 67 connected to terminal D. The movable contact 81 of the microswitch 79 has been moved to upward contact 82 since the arm 14 operated by float rod 15 has pivoted operator 81' for contact arm 81, see FIG. 10, out of contact with the movable member 81 of microswitch 79.

For a fast rinse, hard water is supplied at full supply line pressure through line 21 of valve unit 1 and past the valve seat 24 which has been opened by the washer 23 having moved upwardly. Seat 26 is closed by valve washer 25 seating thereagainst and all the hard water supply now passes on to the first portion 21' of supply line which leads to the top of softener tank S. The hard water line pressure seats check valve 55 as the pressure in the fitting 50 is greater than the lower pressure supplied through the orifice 56' of ejector 58. The by-pass line pressure applied to chamber 35' passes through orifice jet 56' and on down the line 59 to the common brine suction and water replacement line 18 in the brine tank. The replacement water enters the bottom of brine tank B to make a new batch of brine from the dry salt supply therein. Float 16 which had moved with its float rod 15 to the bottom of cylinder 13 now gradually rises and arm 14 is pivoted, whereupon the actuator 81', see FIG. 10, for the microswitch 79 pivots back to normal position and moves arm 81 of microswitch 79 to down position so that it contacts contact 80.

Figure 6:
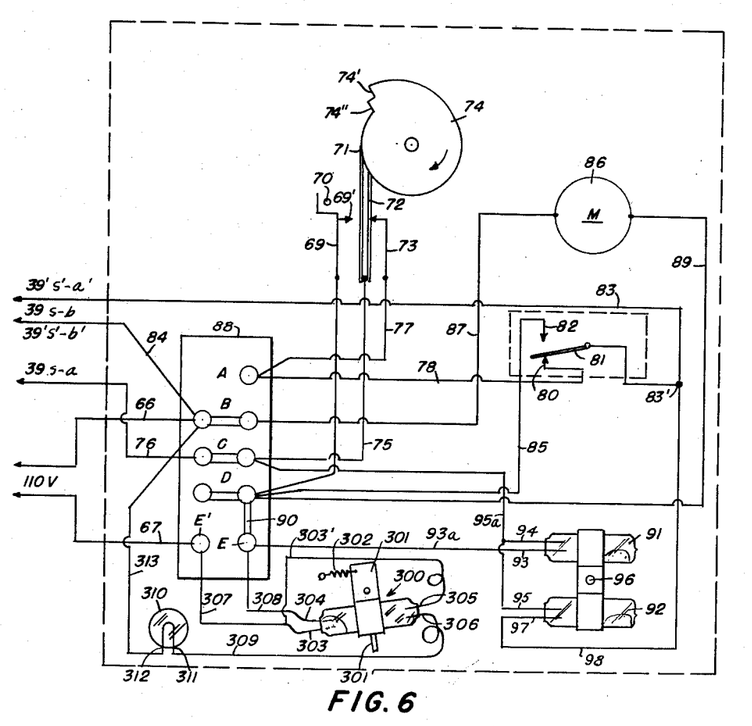
FIG. 6 is a view of one form of the combined control circuits.

In FIG. 6 there is shown a combined control circuit. Certain control circuits for various phases of the operation incorporated in this combined circuit have already been described in connection with Softening or Service—FIG. 2; Backwash—FIG. 3; Brining and Slow Rinse—FIG. 4; and Fast Rinse—FIG. 5. In addition, in FIG. 6 there is shown a clock motor 86 having a power lead 87 leading to terminal B of the terminal block 88, terminal B being connected to power line 66. The other conductor to clock motor 86 is 89 and it leads to terminal D that is connected through jumper 90 to terminal E and thence via an emergency high level of brine tank cut off switch 300 to power line 67 to power supply.

Figure 7:
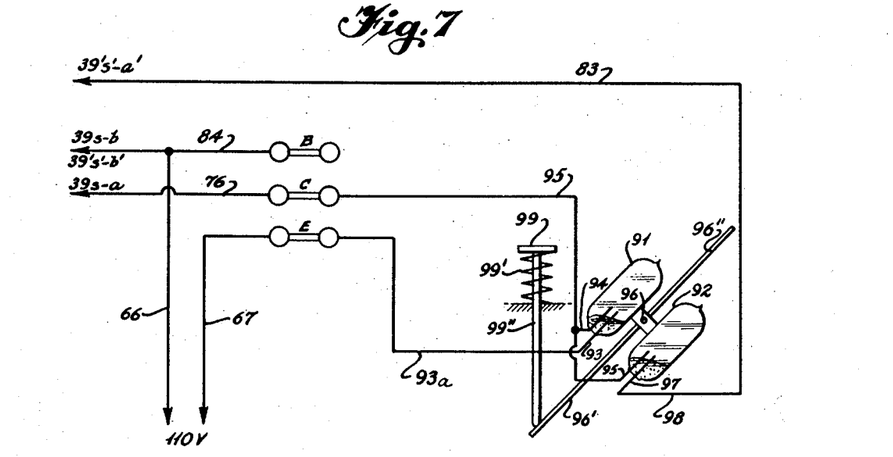
FIG. 7 shows the portion of the control circuit of FIG. 6 for manual actuation to initiate a brining and slow rinse.

Also in FIG. 6 there is shown a pair of pivotally mounted mercury switches 91 and 92 that are normally in off position shown. Switch 91 has one contact 93 connected by lead 93a with block terminal E that is connected to power lead 67 through emergency cut off switch 300. The other terminal 94 of switch 91 is connected by lead 95a to terminal C and thence to line 76 to one side of solenoid 39s, namely its terminal 39s-a. Switches 91 and 92 are so mounted that when pivoted to closed position switch 91 closes slightly ahead of switch 92 in point of time. Lead 95a is connected to terminal 95 of switch 92 and supplies power thereto when switch 91 is closed. As switch 92 closes, it being pivotally mounted with switch 91 as at pivot 96, its other contact 97 is powered and furnishes power through lead 98 that is connected at 83' to conductor 83. Conductor 83, as previously described, feeds to the terminal 39's'-a' of solenoid 39s. Each of the other terminals of solenoids 39s and 39's', namely, terminals 39s-b and 39's'-b' are tied in to terminal B and the other side of the power line 66 as shown. Thus, when the microswitches 91 and 92 are pivoted, a secondary circuit is completed to the solenoids 39s and 39's' and the cycle of Brining and Slow Rinse is initiated as shown in FIG. 4. This occurs when the microswitches 91 and 92, as shown in FIG. 7, are pivoted by a "Guest" or manual push button 99, spring loaded in up position by spring 99', when its plunger 99" strikes operating rod 96' fixed to the mounting of switches 91 and 92. The pivotal mounting of switches 91 and 92 is in the path of an actuator 111 connected with float operated arm 14 and when the replacement water enters the bottom of brine tank B, the pivotal mounting is pivoted back to horizontal position for switches 91 and 92; see FIG. 6, and their circuits are opened.

Also in FIG. 6 there is shown a power cut off switch 300 which is of the pivoted mercury type for illustration having a pivotal mounting 301 which is spring biased by a spring 302 into power supplying attitude. Two terminal electrodes 303 and 304 are at one end while two other electrodes 305 and 306 are at the other end. Power lead 67 goes to terminal E' on the terminal block and thence is connected by electrical conductor 307 to electrode 303. Electrode 304 is connected to power terminal E on the terminal board by conductor 308. Terminals 303 and 305 are connected by a conductor 303'. When switch 300 is tilted to the opposite attitude when float arm 14 goes to higher position 14c, see FIG. 10, the power from lead 67 goes through terminals 305 and 306 by the mercury bath and thence by conductor 309 from 306 to one terminal 311 of the trouble light 310 while the other terminal 312 of the trouble light is connected to the other side of the power line at terminal B by a conductor 313.

Figure 10:
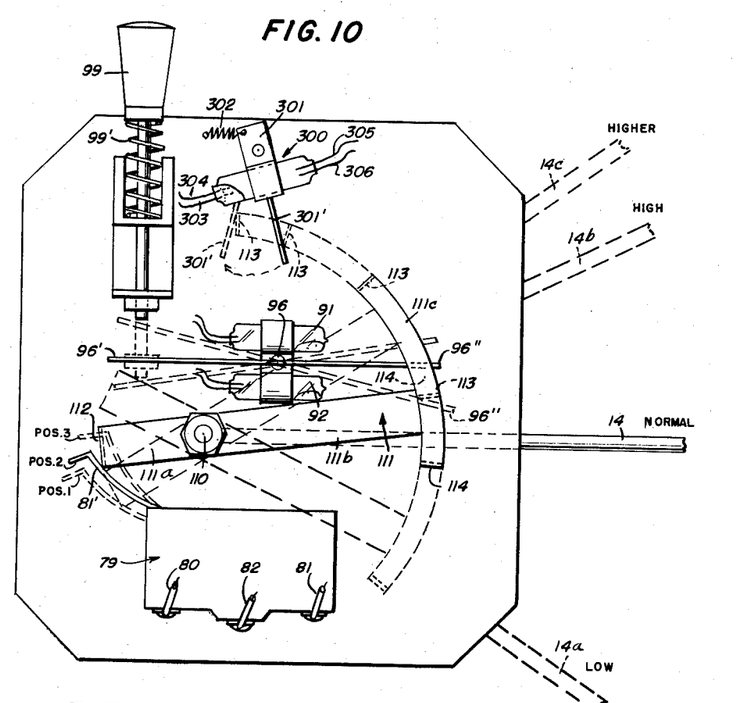
FIG. 10 is another view associated with the combined timer and operating mechanism as controlled by the float actuation of the form of apparatus shown in the circuit in FIG. 6.

In FIG. 10 the emergency or power cut off switch 300 has its depending bracket portion 301' extending to be contacted by lug 113 on bracket 111 that rotates with the float arm 14. Thus, when the liquid level in the brine tank B rises to "higher position" and arm 14 is at position 14c, the cut out switch is tilted to the broken line position and the power circuit is interrupted to the apparatus whereupon the trouble light 310 is lighted. When the power is off of the apparatus the valves will be in normal position, see FIG. 2, wherein Softening or Service position is maintained. The brine tank B is prevented from overflowing by all power cut off contrasted with the "high position" of float arm 14 at 14b where a Brining and Slow rinse is initiated which is followed by Fast Rinse which would also prevent overflow.

Figure 9:
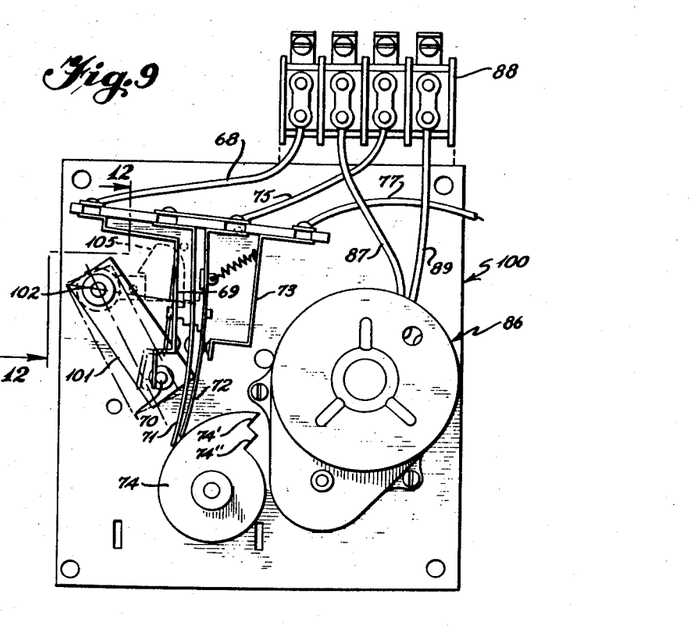
FIG. 9 is a view of the timer control mechanism showing certain cam actuation and timer actuation of the circuits.

In FIG. 9 there is shown a view of part of the timer generally indicated by 100. The power spring contact lead 69 is in power feeding position in its full line position. Pin 70 on arm 101 when rotated clockwise, as shown, moves power lead 69 to broken line position where it is out of power feeding contact with spring contact 71.

Figure 11:
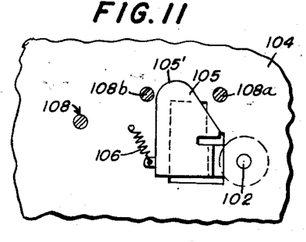
FIG. 11 is a fragmentary view of the timer control taken along line 11—11 of FIG. 12.
Figure 12:
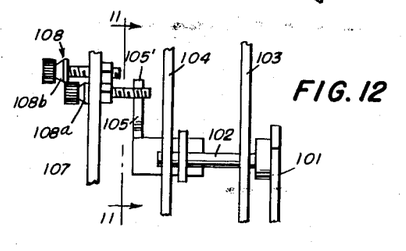
FIG. 12 is a fragmentary view of the time control taken along line 12—12 of FIG. 9.

Pivot shaft 102, as shown in FIG. 12, extends through frame plates 103 and 104 to a position where its other end is rigidly connected with an arm 105. Arm 105 has a camming surface 105', as shown in FIGURES 11 and 12, and is spring biased by spring 106 as shown in FIG. 11. A clock face plate 107 is shown in FIG. 12 and in it are threadedly received adjustably mounted timing screw members generally indicated at 108. To set the clock for actuation, a screw is screwed out, as example, screw 108b. The action that takes place as screw 108b passes cam 105' is that arm 105 is not moved. This allows the arm 101 carrying pin 70 to remain stationary and thus the power spring leaf 69 is in its full line position, see FIG. 9, so that it contacts and makes a circuit with leaf spring 71 which has been brought into contact therewith by action of cam 74, see FIG. 3. So also as the cam 74 rotates further clockwise, see FIG. 4, leaf spring 72 contacts 73 to complete a further circuit.

In order to not feed power from leaf spring 69 to leaf spring 71, arm 101 carrying pin 70 must be pivoted clockwise into broken line position, as shown in FIG. 9, to move contact spring 69 to the broken line position whereupon no circuit is completed to 71, 72 and 73. By screwing in a screw such as 108a, see FIG. 12, it will make contact with cam surface 105' of arm 105, arm 105 is pivoted and pivot shaft 102 likewise pivots arm 101 carrying pin 70.

*Manual Initiation of Regeneration*

The normal position of microswitch 79 is with its contact arm 81 contacting contact 80, as shown in FIGS. 4 and 6. An actuation arm 81' operably connected with arm 81 is shown in FIG. 10. Three positions are shown for arm 81'; positions marked Pos. 1 and Pos. 2 are in effect alike to close contact arm 81 with contact 80. Position marked Pos. 3 for arm 81' is the up position caused by rotation of float arm 14 as will be described. When in position Pos. 3, the contact arm 81 makes contact with contact 82, see FIGS. 5 and 8, to complete a secondary energization circuit to solenoid 39's' so as to carry out the fast rinse as shown in FIG. 5.

When extra cycling above the set automatic operation is desired as when additional soft water is desired as a greater amount of soft water is being used, the manual or "Guest" button 99 is pressed down. This moves rod 99" into contact with pivot arm 96', see FIGS. 7 and 10, and the mercury switches 91 and 92, as previously described, completes the circuit to energize solenoids 39s and 39's' to initiate a Brine operation which is automatically followed by Fast Rinse and return to Service condition of the apparatus.

Figure 14:
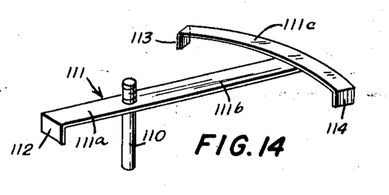
FIG. 14 is an isometric view of a part of the float controlled mechanism for actuating certain switches shown in FIGS. 6 and 10.

In FIG. 10 the float arm 14 control mechanism is illustrated. Arm 14 is rigidly mounted on a pivot shaft 110. Rigidly attached to shaft 110 is a T-shaped arm 111, see FIG. 14, and it has a tail portion 111a and a head portion 111b. Tail portion 111a has a transverse arm 112 which strikes against and actuates the microswitch actuator arm 81'. The cap of the T-shaped arm is shown at 111c and it has transversely extending arms 113 and 114 at the ends of the cap 111c.

When the brine is removed from the brine tank B by ejector 58 in a brining operation, float 16 and its rod 15 moves down in tube 13 and arm 14 pivots clockwise to position 14a as shown in FIG. 10. As arm 14 pivots to position 14a, the T-shaped arm 111 rigid therewith also pivots clockwise to the broken line position shown in FIG. 10 and arm 112 on 111 allows arm 81' of microswitch 79 to assume the upper position, while arm 113 on cap 111c strikes rod 96" on the mounting for mercury switches 91 and 92 to reset them in a generally horizontal position, see FIG. 6, so that their circuits are interrupted. The microswitch 79 provides the circuit arrangement as shown in FIG. 8 to maintain energization of solenoid 39's' to carry out the Fast Rinse cycle. As the float arm 14 comes back to horizontal full line position, see FIG. 10, the microswitch arm 81' breaks the contact between 81 and 82 and returns 81 to a position of contacting contact 80, see FIGS. 4 and 6.

*Liquid Level in Brine Tank at "High" Position*

In case the replacement water in brine tank B reaches an above normal height by a few inches, the float 16 and its rod 15 will be raised. Float arm 14 will be moved into the postion 14b, see FIG. 10, and arm 111 will also pivot to upper position shown in broken line in FIG. 10. Arm 114 on 111c will strike arm 96" of the switch mounting for mercury switches 91 and 92 to move them into contact position, as shown also in FIG. 7, however, the manual or "Guest" push button 99 there shown will have remained in its full line position as shown in FIG. 10. When switches 91 and 92 are closed by their counterclockwise pivoting, a cycle of regeneration of Brining and Slow Rinse followed by Fast Rinse will take place. When float arm 14 is in position 14a the arm 112 will have moved contact arm 81 into contact with contact 82 to energize solenoid 39's' to provide for the Fast Rinse cycle. Replacement water will be introduced into the bottom of the brine tank and float arm 14 will come back to normal and the microswitch 79 will cut off the circuit to solenoid 39's' to return the system to a service condition.

The unscheduled regeneration of the system will be a warning to the householder that a possible repair of the system may be necessary.

*Power Cut Off*

The power cut off switch 300 as described above is actuated when the float arm 14 reaches a position at "Higher" on occasion of the level of refill water in the brine tank not cutting the refill off at "Normal" or "High" as might occur when a valve sticks or there is a malfunction. Thus, the switch 300 is pivoted to broken line position, as shown in FIG. 10, and power is cut off to terminal E, see FIG. 6, as previously explained.

*Modification in Float Controlled Switches*

FIGURES 15-24 inclusive show the modified float controlled switches which are of the spring biased type, however, both the mercury switches previously described and the modified switches may be considered to be pivoted switches.

Figure 15:
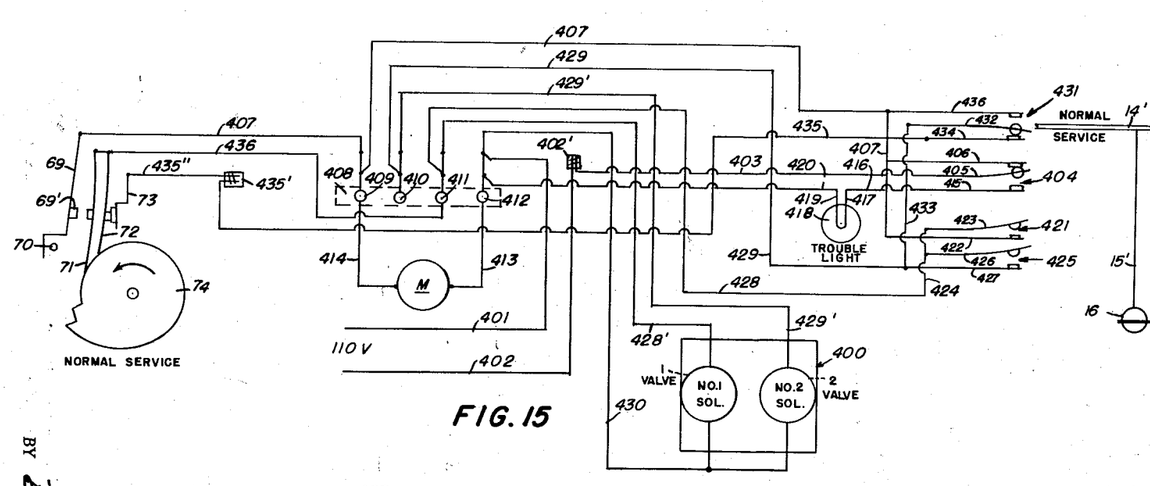
FIG. 15 is an operational schematic drawing of a modified form of control apparatus of a different type in Normal Service control but comparable to the apparatus of FIGS. 6 and 10.

FIG. 15 is a schematic diagram of the control for valves 1 and 2 and the respective solenoids 1 and 2 which operate these control valves as described above. The valves are shown diagrammatically in a combined valve housing 400 such valve body and its passageway being like those disclosed in my copending applications Serial No. 707,267, filed January 6, 1958 and Serial No. 785,237, filed January 6, 1959, now U.S. Patent 3,014,497, issued December 26, 1961.

The cam operated by the timer is shown at 74 but as a rear view as contrasted with the front view of the cam shown in FIGURES 3 and 4. The operation in FIG. 15 is for "Normal or Service" position wherein softening and treatment of the water is taking place, see position of valves 1 and 2 and the elements thereon in FIG. 1.

In the normal service position the float 16 and its arm 14' and rod 15' are shown. The switches controlled thereby are also shown in Normal or Service position in FIG. 19.

In FIG. 15 power is supplied from a 110 v. supply, for example, by power leads or conductors 401 and 402. Conductor 402 is connected by a connection nut 402' to a conductor 403 that leads to a power cut out switch generally indicated at 404 to a middle leaf spring contact 405 that is normally in up position to contact terminal or finger 406 to supply power to a common power conductor 407 that leads to terminal 409 on terminal block 408. The other terminals on block 408 are 410, 411 and 412. The electric timer motor M is connected by lead 413 to terminal 412 and by lead 414 to terminal 409. The other power lead 401 leads to terminal 412. The switch 404 has a bottom finger terminal 415 that is connected by conductor 416 to terminal 417 of trouble light 418 whose other terminal 419 is connected by conductor 420 to power terminal 401. When switch 404 is moved to the position shown in FIG. 24 by float arm 14' being moved to position 14'c by "higher" lever of liquid in the brine tank B all power to the apparatus is shut off as all power is cut off of conductor 407.

Switch generally indicated at 421 has a leaf spring terminal 423 and a leaf terminal 422. Terminal 422 is connected to power conductor 407. Leaf spring terminal 423 is connected by a common conductor 424 and conductor 48 to terminal 411 and also to leaf spring terminal 426 of switch 425. Switch 421 supplies power to solenoid No. 1 to control valve 1 while switch 425 controls power to solenoid No. 2 which controls valve 2.

Conductor 424 is connected to terminal 411 by conductor 428. Terminal 411 is connected by conductor 428' to one side of solenoid No. 1. The other solenoid No. 2 is connected to terminal 427 of switch 425 by conductor 429 leading to terminal 410 and conductor 429' leading to one terminal of solenoid No. 2. The other two common terminals of the solenoids, Nos. 1 and 2, are connected by common conductor 430 to power terminal 412.

The fourth switch generally indicated at 431 is a secondary circuit or holding circuit switch to complete another circuit to solenoid No. 2 to maintain it energized for a Fast Rinse of the softener tank S while switches 421 and 425 for solenoids Nos. 1 and 2 are being reset to open position.

Secondary circuit switch 431 has a control leaf spring terminal 432 which is connected by conductor 433 to conductor 429 and thence by 429' to the solenoid No. 2. Power is supplied to leaf spring terminal 432 by two different circuits. When in the normal down position shown in FIGS. 15 and 19, the lower leaf terminal 434 is connected by conductor 435 to terminal 73 of the cam operated timer switch, a connector nut 435' serving to make the coupling. The other circuit to supply power to central leaf spring terminal 432 is the leaf terminal 436 which is connected to power lead 407.

In FIG. 15 the common power spring fingers 71 and 72 on the cam operated switch of the timer are connected to terminal 411 by conductor 436 while the spring finger 73 is connected to conductor 435 by the lead 435" and nut 435'.

Figure 16:
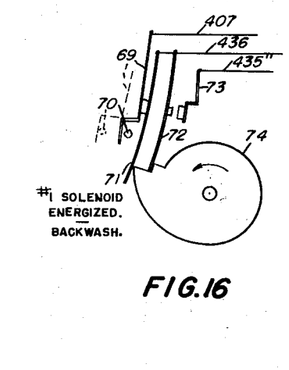
FIG. 16 is a fragmentary showing of the timer cam and the switches it controls for energizing No. 1 valve solenoid to cause Backwash.
Figure 17:
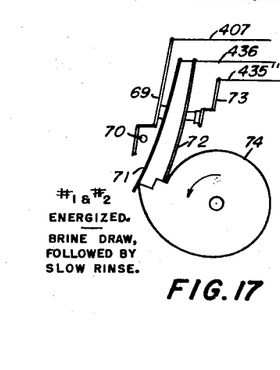
FIG. 17 is a fragmentary showing similar to FIG. 16 but energizing No. 1 valve and No. 2 valve solenoids to cause Brine draw followed by Slow Rinse.
Figure 18:
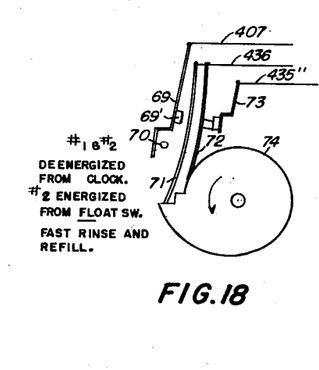
FIG. 18 is a fragmentary showing similar to FIG. 16 but with No. 1 and No. 2 valve solenoids deenergized from time clock control but with No. 2 solenoid valve energized from float switch to cause Fast Rinse of mineral tank and Refill of brine tank.
Figure 19:
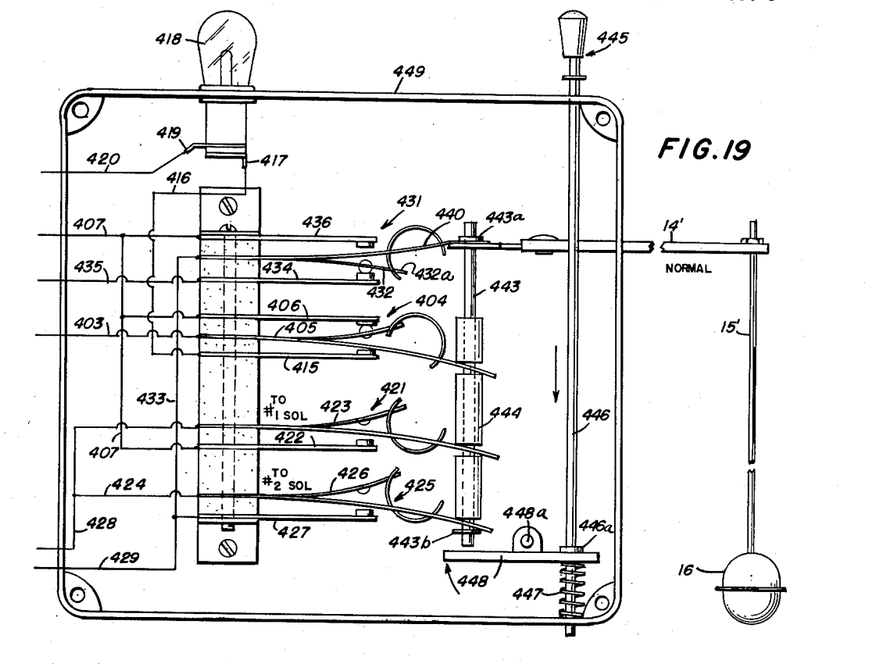
FIG. 19 is a showing of a modified set of float controlled switches in normal service position and with manual push button operative apparatus.
Figure 22:
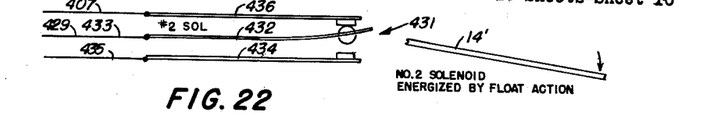
FIG. 22 shows the position of the float arm schematically when the holding circuit switch is energizing the No. 1 valve solenoid.
Figure 23:
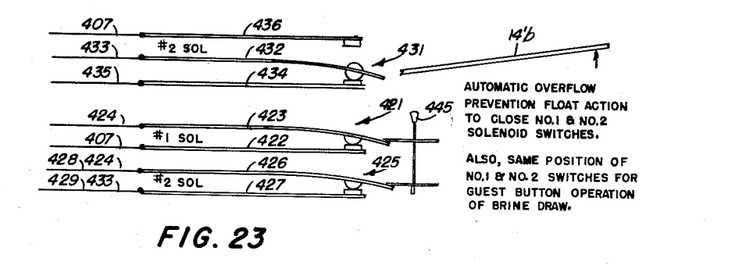
FIG. 23 illustrates the relative position of the float arm in high position causing the No. 1 and No. 2 regular switches for the corresponding solenoids to be closed to cause operation.
Figure 23A:
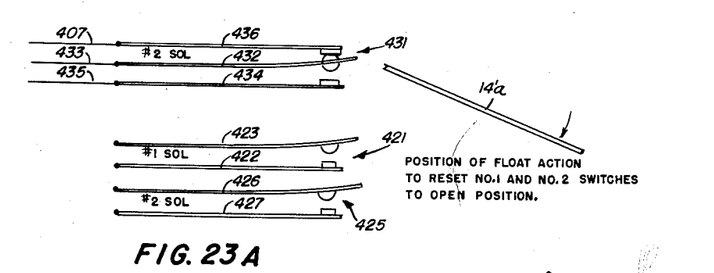
FIG. 23A shows lower position of float arm to reset No. 1 and No. 2 switches into open position while hold switch for No. 2 solenoid and valve remains closed thus causing fast rinse and refill.
Figure 24:
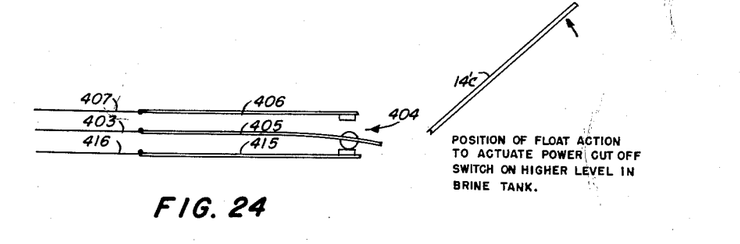
FIG. 24 is a higher position of the float arm causing the power cut off switch to cut off power to the apparatus.

FIGURES 16, 17 and 18 show operation of the solenoids No. 1 and No. 2 and their valves through use of the cam 74 driven by the timer motor M whereas the spring finger switch system 431 at the right in FIG. 15 shows operation of the solenoids No. 1 and No. 2 and their valves through float arm action which is further illustrated in FIGURES 22–24 inclusive.

In FIG. 16 the timer actuated cam switches are positioned to energize solenoid No. 1 and valve 1 to carry out a Backwash of the softener tank S.

In FIG. 17 both of the solenoids, Nos. 1 and 2, are energized and valves 1 and 2 are in operative position to cause with their respective conduits and apparatus an introduction of brine from the Brine tank B to the mineral bed M in the Softener tank S and a follow up of a Slow Rinse of the mineral bed.

Referring to FIG. 18 it will be observed that cam 74 has been rotated further counter-clockwise as here viewed from the rear as contrasted with FIG. 4 to cause Nos. 1 and 2 solenoids to be deenergized by their normal circuits while a secondary or holding circuit through switch 431 is maintaining solenoid No. 2 open for a Fast Rinse and Refill of water into the brine tank B. As the refill water reaches the proper level to cause the float arm 14' to reach Normal position, see FIGS. 15 and 19, switch contact 432 contacts leaf terminal 434.

Figure 20:
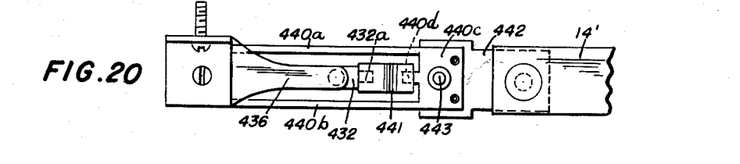
FIG. 20 is an enlarged plan view of the type of switches shown in FIG. 19 with the float arm broken away.
Figure 21:
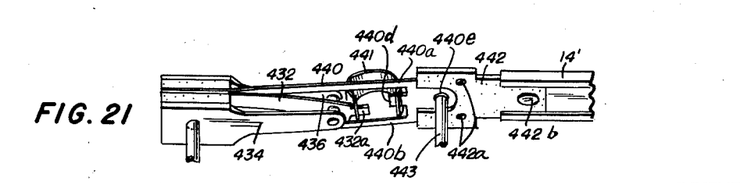
FIG. 21 is an isometric view looking up into the bottom of the switch shown in FIG. 20.

In FIGS. 20 and 21 there is shown an enlarged view of the type of switch such as used for switches 404 and 431. The leaves of the switch are stacked along with the bifurcated stacked end of the leaf operator 440 which extends out beyond the ends of the outside leaf terminals 434 and 436 while the center leaf spring terminal 432 extends coplanar with and between the bifurcations 440a and 440b of the operator leaf 440.

The leaf operator 440 has a solid right hand end 440c with a tongue 440d extending therebetween to the left. The center leaf spring terminal 432 has a small central tongue 432a extending from the right-hand end and the tongues 432a and 440d are coupled by a biasing U-shaped spring member 441. The right-hand end of the member 440 is coupled to the float member 14' by a non-conductive and specially shaped intermediate member 442 that is riveted at 442a to member 440 and at 442b to the float member 14' that is channel shaped in cross section. There is a common coupling member 443 in the form of an elongated cylindrical bar that extends through an aperture 440e in member 440. The rod coupling member 443 has securing washers 443a and 443b at the top and bottom. Suitable spacer collars 444 are positioned between the respective operators 440 and of determined length to accomplish the operating purpose of the respective switches. It will be observed that switches 431 and 404 are biased as indicated in the normal showing in FIG. 19.

In FIG. 22 the float arm 14' has just started to move below normal horizontal position as the brine level is being lowered and float 16 descends whereupon switch 431 has contacts at 432 and 436. The leaf spring terminal 432 snaps into contact with leaf terminal 436 and a holding circuit is completed for solenoid No. 2 whether the apparatus is time control operated or manually operated by the Guest Button generally indicated at 445 and mounted in the switch box housing 449. The Guest Button 445 has a rod 446 extending vertically in housing 449 and passes through an aperture in a pivot bar 448 that is pivoted at 448a which is used to pivot against the bottom of rod 443 and raise rod 443 to snap the switches 421 and 425 into the closed position shown in FIG. 23. Washer 446a and spring 447 biasly secure or couple rod 446 to pivot bar 448.

In FIG. 23 there is indicated the float arm 14' and position of switches 431 and 421 on "Automatic Overflow Prevention." The refill water has raised float arm 14' to a "high" position above "normal"—namely, to position 14'b. The switch 431 is in its normal position while switches 421 and 425 have snapped to closed position completing circuits to energize solenoids Nos. 1 and 2 and to carry out Brining and Slow Rinse, thus decreasing the brine tank level. The position of switches 421 and 425 is also the same as though Guest Button 445 had been pushed down to set them into closed position.

In FIG. 23A there is illustrated the position of the float arm 14′ as at brine lowered position 14′a wherein secondary circuit or holding circuit switch 431 for solenoid No. 2 has remained closed as shown and switches 421 and 425 have been snapped back to open or normal position.

The feature shown in FIG. 24 is that of cutting out electrical power to the apparatus and placing it in Normal or Service position of softening. This positioning of float arm 14′ occurs as at "higher position" 14′c when there is a valve sticking or some malfunction in the refill of the water in the brine tank. The leaf spring terminal 405 is snapped to low position and the power circuit from power lead 403 to leaf terminal 406 and power conductor 407 is broken. A warning circuit is completed from 405 to 415 and the trouble light 418 is energized.

The apparatus according to this invention as illustrated by the apparatus in FIGS. 1–14 inclusive, and the modified control apparatus in FIGS. 15–24 inclusive, uses only two solenoid actuated first and second valve elements each having first and second valve means thereon to control flow of fluids. There are a minimum of operating parts; a safety feature is built into the brine tank control so that recycling or complete power cut out and return to Softening or Service position is set upon "high" or "higher" liquid level being reached in refill of the brine tank, thus preventing overflow of brine tank. Usually a recycling set up of the apparatus clears the malfunction but the power cut out switch 404 serves as an emergency cut off of the power should recycling not clear the malfunction. There is accomplished in the apparatus the appropriate upflow backwash for the minerals of the ion exchange system as prescribed by the mineral manufacturers. A slow brining which is a downflow operation under pressure controlled conditions is applied to the mineral bed while the free board in the softener tank above the mineral level is isolated. A slow rinse that is downflow and controlled reduced pressure is maintained. A fast rinse that is a downflow under full controlled pressure is provided to remove turbidity and any iron traces and to reset or repack the mineral bed. Flexibility of adjustments is easily provided to change the capacity of the system.

I claim as my invention:

1. In a water softener having a softener tank, a brine tank, a hard water supply line, a service line, a first electrically operated valve means in the supply line, a second electrically operated valve means in the service line, said first and second electrically operated valve means being deenergized in normal service position, a drain line, means connecting the supply line to the top of the softener tank, means connecting the bottom of the softener tank to the service line, means connecting a portion of the supply line with said drain line through said first valve means, means connecting a portion of the service line with the drain through said second valve means, and means connected with said second valve means and operable therewith for conducting brine from said brine tank and introducing it into said softener tank and supplying replacement water to said brine tank, control apparatus for completing electrical circuits to said valve means for operation of the same for brining and rinsing the softener tank and replacing water in said brine tank comprising first and second switches for completing circuits respectively to actuate said valve means, said first and second switches being connected to a power source and respectively to said first and second valve means, closing of said first and second switches and valve means initiating a brining and rinsing operation through said softener tank, a secondary electrical switch means for completing a secondary circuit to said second valve means, a liquid level responsive means in said brine tank indicative of low level, normal level, high level and higher level therein, and connected with said first and second switches to move them to open position in response to low level condition in said brine tank on removal of said brine and closed position on high level position of said brine in said brine tank, said liquid level responsive means being connected with said secondary electrical switch means to move same into closed position in response to low level in said brine tank, said secondary switch means being connected to the power source and providing a secondary circuit to said second valve means to maintain same in activated position after said second switch has been opened, said liquid level responsive means moving to normal position upon said replacement water entering said brine tank, said last named means on returning to normal level position in response to normal liquid replacement level interrupting said closed secondary circuit, said liquid level responsive means being connected with said first and second switches to close same upon the liquid level reaching said high level position to reinitiate a brining and rinsing operation, an emergency cut out switch connecting said power source to said other switches to interrupt all power thereto when opened, and means on said liquid level responsive means and operably connected with said emergency switch to open the same on said liquid level responsive means rising to said higher level position whereby said first and second valve means return to normal service position and said brine tank level is limited.

2. Apparatus of the character described in claim 1 including separate means for moving said first and second switches to closed position, said separate means comprising a Guest Button having means to strike and move said first and second switches to closed position whereupon a brining and slow rinse followed by a fast rinse takes place to recondition said softener tank.

3. Apparatus of the character described in claim 1 wherein said first and second switches are pivoted type switches and including pivotal mounting means for said first and second switches.

4. Apparatus of the character described in claim 1 wherein said switches comprise leaf spring terminals and leaf terminals mounted for movement of the leaf spring terminal into and out of control position with said leaf terminal, said leaf spring terminal being connected by biasing spring means to a movable operator member, said movable operator member being connected to said liquid level responsive means for imparting control movement thereto.

5. Apparatus of the character described in claim 4 wherein said separate means for moving said first and second switches comprises a Guest Button having a push rod biased to up position and having a connection means to said movable operator for each of said first and second switches to move the leaf spring terminals of each into contact position with said corresponding leaf terminal thereof.

References Cited in the file of this patent
UNITED STATES PATENTS

| | | |
|---|---|---|
| 2,051,155 | Staegemann | Aug. 18, 1936 |
| 2,265,225 | Clark | Dec. 9, 1941 |